(12) United States Patent
Morino et al.

(10) Patent No.: US 10,520,343 B2
(45) Date of Patent: Dec. 31, 2019

(54) THERMAL FLOWMETER

(71) Applicant: HITACHI AUTOMOTIVE SYSTEMS, LTD., Ibaraki (JP)

(72) Inventors: Takeshi Morino, Hitachinaka (JP); Shinobu Tashiro, Hitachinaka (JP); Masashi Fukaya, Tokyo (JP); Atsushi Inoue, Hitachinaka (JP); Masanobu Ino, Hitachinaka (JP); Naoki Saito, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 144 days.

(21) Appl. No.: 15/505,703

(22) PCT Filed: Jul. 10, 2015

(86) PCT No.: PCT/JP2015/069813
§ 371 (c)(1),
(2) Date: Feb. 22, 2017

(87) PCT Pub. No.: WO2016/047243
PCT Pub. Date: Mar. 31, 2016

(65) Prior Publication Data
US 2017/0276525 A1 Sep. 28, 2017

(30) Foreign Application Priority Data

Sep. 26, 2014 (JP) .................................. 2014-197117

(51) Int. Cl.
*G01F 1/684* (2006.01)
*G01F 1/69* (2006.01)
(Continued)

(52) U.S. Cl.
CPC .............. *G01F 1/6842* (2013.01); *G01F 1/69* (2013.01); *G01F 5/00* (2013.01); *G01P 5/18* (2013.01)

(58) Field of Classification Search
CPC .......... G01F 1/6842; G01F 1/684; G01F 1/69; G01F 5/00; G01P 5/18
(Continued)

(56) References Cited

U.S. PATENT DOCUMENTS 6,240,775 B1 * 6/2001 Uramachi ............. G01F 1/6842
73/114.34
6,526,822 B1 3/2003 Maeda et al.
(Continued)

FOREIGN PATENT DOCUMENTS

EP      1164360 A2    12/2001
JP      2001-174305 A  6/2001
(Continued)

OTHER PUBLICATIONS

Extended European Search Report dated Apr. 24, 2018 for the European Patent Application No. 15845189.8.
(Continued)

*Primary Examiner* — Marrit Eyassu
(74) *Attorney, Agent, or Firm* — Volpe and Koenig, P.C.

(57) ABSTRACT

The present invention provides a thermal flowmeter having good measurement accuracy by reducing deviation in the flow velocity distribution of a gas under measurement flowing through an auxiliary passage. An auxiliary passage 330 for taking in a portion of a gas under measurement IA flowing through a main passage 124 has a curved passage 32a that bends toward a flowrate measurement element 602. The curved passage 32a has a resistance portion 50 formed therein that applies resistance to the flow of the gas under measurement IA flowing through the outer peripheral side (Continued)

CO of the curved passage 32a so that the pressure loss of the gas under measurement IA flowing through the outer peripheral side CO is high compared to that of the gas flowing through the inner peripheral side CI of the curved passage 32a.

7 Claims, 17 Drawing Sheets

(51) Int. Cl.
  *G01F 5/00* (2006.01)
  *G01P 5/18* (2006.01)
(58) Field of Classification Search
  USPC .................................................. 73/202.5
  See application file for complete search history.

(56) References Cited

U.S. PATENT DOCUMENTS

| | | | |
|---|---|---|---|
| 2003/0046996 A1 | 3/2003 | Nakada et al. | |
| 2006/0059985 A1* | 3/2006 | Seki | G01F 1/6842 73/202.5 |
| 2006/0150730 A1* | 7/2006 | Lenzing | F02D 41/18 73/202.5 |
| 2007/0169548 A1* | 7/2007 | Kikawa | G01F 1/6842 73/202.5 |
| 2008/0283014 A1* | 11/2008 | Konzelmann | F02D 41/187 123/184.21 |
| 2011/0072895 A1* | 3/2011 | Okamoto | G01F 1/6842 73/114.34 |
| 2012/0103086 A1* | 5/2012 | Goka | G01F 1/6842 73/204.26 |
| 2013/0019675 A1 | 1/2013 | Ban et al. | |
| 2013/0055799 A1 | 3/2013 | Tsujii | |
| 2015/0101402 A1 | 4/2015 | Kishikawa et al. | |
| 2016/0282161 A1 | 9/2016 | Itou | |

FOREIGN PATENT DOCUMENTS

| | | |
|---|---|---|
| JP | 2003-149016 A | 5/2003 |
| JP | 2003-177045 A | 6/2003 |
| JP | 2003-177046 A | 6/2003 |
| JP | 2006-506625 A | 2/2006 |
| JP | 2008-058128 A | 3/2008 |
| JP | 2008-286396 A | 11/2008 |
| JP | 2009-243996 A | 10/2009 |
| JP | 2011-075359 A | 4/2011 |
| JP | 2013-024654 A | 2/2013 |
| JP | 2013-029528 A | 2/2013 |
| JP | 2013-053965 A | 3/2013 |
| JP | 2013-190447 A | 9/2013 |
| JP | 5646030 B1 | 12/2014 |
| JP | 2016-176906 A | 10/2016 |
| WO | 2013/187229 A1 | 12/2013 |

OTHER PUBLICATIONS

Communication Pursuant to Rule 114(2) EPC dated Jul. 23, 2018 for the European Patent Application No. 15845189.8.
International Search Report for WO 2016/047243 A1, dated Oct. 27, 2015.
Communication pursuant to Rule 114(2) EPC dated Jan. 2, 2019 for the European Patent Application No. 15845189.8.

* cited by examiner

THERMAL FLOWMETER

TECHNICAL FIELD

The present invention relates to a thermal flowmeter.

BACKGROUND ART

A thermal flowmeter is used to measure a flow amount of a gas and includes a flow measurement element which measures a flow amount. Here, the flow amount of the gas is measured in such a manner that heat is transmitted between the flow measurement element and the gas which is a measurement object. The flow amount which is measured by the thermal flowmeter is widely used as an important control parameter of various devices. The thermal flowmeter has a feature that a gas flow amount, for example, a mass flow amount can be measured with relatively high accuracy compared to other flowmeters.

However, there has been a desire to further improve measurement accuracy of a gas flow amount. For example, in a vehicle equipped with an internal combustion engine, there is an extremely high demand of saving fuel or purifying an exhaust gas. In order to handle these demands, an intake air amount which is an important parameter of the internal combustion engine needs to be measured with high accuracy.

A thermal flowmeter which measures an amount of intake air led to an internal combustion engine includes a sub-passage which takes a part of the intake air amount and a flow measurement element which is disposed in the sub-passage. Here, a state of a measurement object gas flowing in the sub-passage is measured by the transmission of heat between the flow measurement element and the measurement object gas and an electric signal indicating an amount of the intake air led to the internal combustion engine is output.

For example, as a technology of such a thermal flowmeter, PTL 1 discloses a "flow amount measurement device in which a plate-shaped board is disposed to form a fluid passage at each of a sensor element mounting face in the plate-shaped board and a rear face opposite to the sensor element mounting face and a curve passage portion is formed at an upstream side of the plate-shaped board of a sub-passage so that a direction changes." In this Patent Literature, a "wall face in the vicinity of the curve passage portion is provided with an inclined portion which is inclined so that an end located near a side wall face of the curve passage portion facing the sensor element mounting face is located at an inner loop of the curve passage portion in a direction following the side wall face."

CITATION LIST

Patent Literature

PTL 1: JP 2011-75359 A

SUMMARY OF INVENTION

Technical Problem

In the thermal flowmeter of PTL 1, the inclined portion is provided at the wall face (an outer peripheral wall face) in the vicinity of the curve passage portion (a curved passage) to suppress an intrusion of dust toward the sensor element. However, if the inclined portion is simply provided at the wall face (the outer peripheral wall face) in the outer periphery while any resistance is not given to a flowing measurement object gas, it is found that a separation flow (a separation vortex) is generated at the wall face (an inner peripheral wall face) of the inner loop from a fluid analysis conducted by the inventors. As a result, a flow is biased toward the sensor element because a flow rate distribution becomes fast at the vicinity side (the outer peripheral side) compared to the inner loop side (the inner peripheral side). This bias changes when an excessive flow is generated during a pulsation and thus the flow rate on the flow measurement element becomes different from that of a non-transient period. As a result, a measurement error occurs during a pulsation.

The invention is made in view of such circumstances and an object of the invention is to provide a thermal flowmeter capable of improving measurement accuracy by reducing a bias of a flow rate distribution of a measurement object gas flowing in a sub-passage.

Solution to Problem

In order to attain the above-described object, according to the invention, there is provided a thermal flowmeter which includes a sub-passage taking a part of a measurement object gas flowing in a main passage and a flow measurement element measuring a flow amount of the measurement object gas flowing in the sub-passage and measures a flow amount of the measurement object gas flowing in the main passage on the basis of a measurement value obtained by the flow measurement element, in which the sub-passage includes a curved passage which is bent toward the flow measurement element so that the measurement object gas taken from the main passage flows to the flow measurement element, and in which the curved passage is provided with a resistance portion which applies a resistance to a flow of the measurement object gas flowing at an outer peripheral side of the curved passage so that pressure loss of the measurement object gas flowing at the outer peripheral side of the curved passage becomes higher than that of an inner peripheral side of the curved passage.

Advantageous Effects of Invention

According to the invention, it is possible to improve measurement accuracy of a measurement object gas by reducing a bias of a flow rate distribution of the measurement object gas flowing in a sub-passage.

DESCRIPTION OF EMBODIMENTS

Hereinafter, an embodiment of the invention will be described with reference to the drawings.

Figure 1:
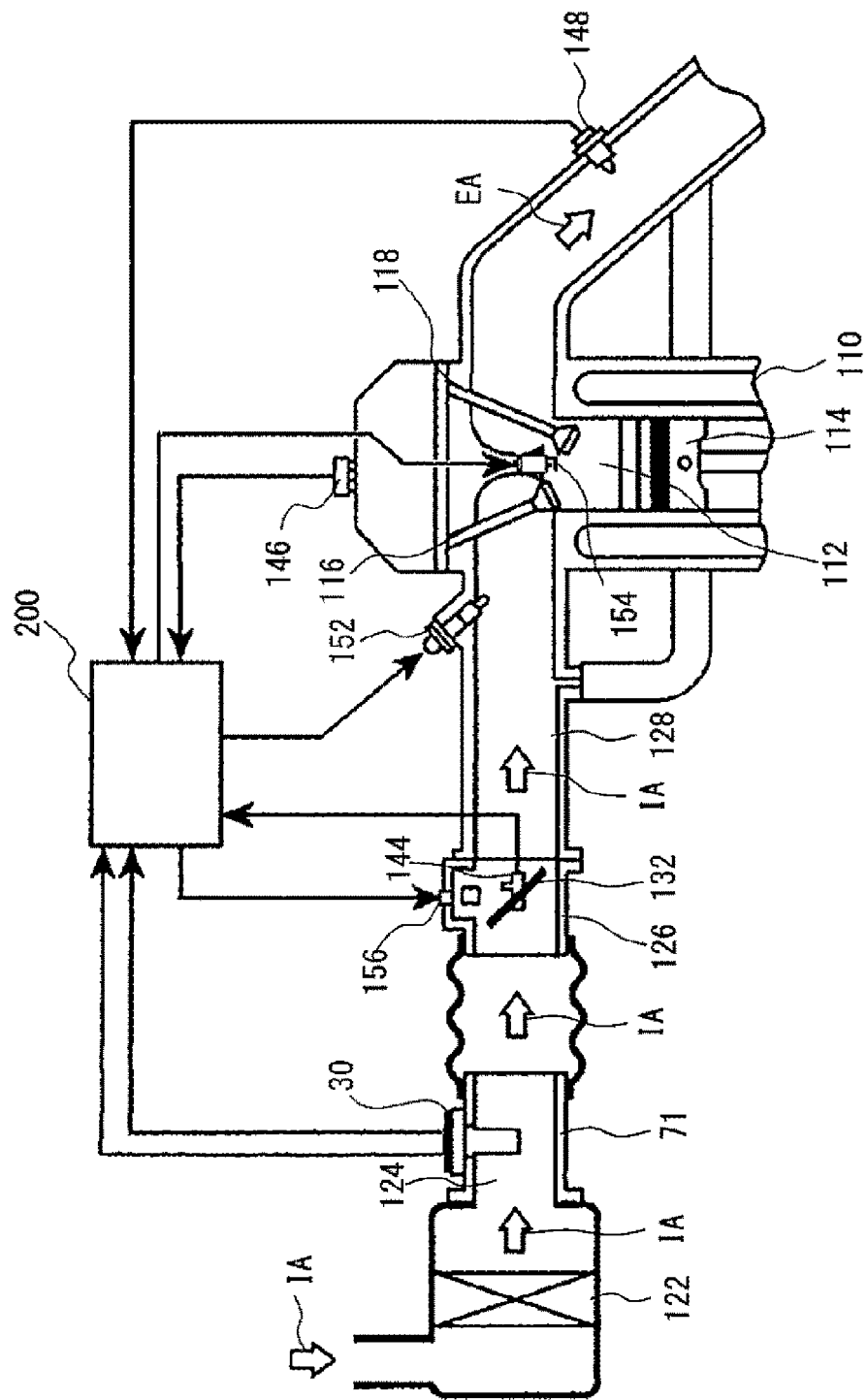
FIG. 1 is a system diagram illustrating an embodiment in which a thermal flowmeter according to the invention is used in an internal combustion engine control system.

1. Internal Combustion Engine Control System and Thermal Flowmeter Disposed Therein FIG. 1 is a system diagram illustrating an embodiment in which a thermal flowmeter according to the embodiment is used in an electronic fuel injection type internal combustion engine control system. As illustrated in FIG. 1, intake air which is a measurement object gas IA is suctioned from an air cleaner 122 and is led to a combustion chamber of an engine cylinder 112 through, for example, an intake body including an intake pipe 71 provided with a main passage 124, a throttle body 126, and an intake manifold 128 on the basis of an operation of an internal combustion engine 110 including the engine cylinder 112 and an engine piston 114.

A flow amount of the measurement object gas IA which is the intake air led to the combustion chamber is measured by a thermal flowmeter 30 according to the embodiment. Then, on the basis of the measured flow amount, fuel is supplied from a fuel injection valve 152 and is led to the combustion chamber along with the measurement object gas IA which is the intake air in a mixed gas state. Additionally, in the embodiment, the fuel injection valve 152 is provided at an intake port of the internal combustion engine. Here, the fuel injected to the intake port forms a mixed gas along with the measurement object gas IA which is the intake air and the mixed gas is led to the combustion chamber through the intake valve 116 so that the mixed gas is burned and mechanical energy is generated.

The thermal flowmeter 30 can be similarly used not only in a system that injects a fuel to the intake port of the internal combustion engine illustrated in FIG. 1 but also in a system in which a fuel is directly injected to each combustion chamber. Both systems have substantially the same basic concept in a control parameter measurement method including a method of using the thermal flowmeter 30 and an internal combustion engine control method including a fuel supply amount or an ignition timing. Then, as a representative example of both systems, a system that injects a fuel to the intake port is illustrated in FIG. 1.

The fuel and the air which are led to the combustion chamber are kept in a state in which the fuel and the air are mixed with each other and are burned to explode by a spark ignition of an ignition plug 154 so that mechanical energy is generated. The burned gas is led from an exhaust valve 118 to an exhaust pipe and is discharged as exhaust air EA from the exhaust pipe to the outside of a vehicle. A flow amount of the measurement object gas IA which is the intake air led to the combustion chamber is controlled by a throttle valve 132 an opening degree of which changes on the basis of an operation of an accelerator pedal. A fuel supply amount is controlled on the basis of the flow amount of the intake air led to the combustion chamber. Then, a driver can control the mechanical energy generated by the internal combustion engine by controlling the opening degree of the throttle valve 132 to control the flow amount of the intake air led to the combustion chamber.

A flow amount, a humidity, and a temperature of the measurement object gas IA which is the intake air taken from the air cleaner 122 and flowing through the main passage 124 are measured by the thermal flowmeter 30 and electric signals representing the flow amount, the humidity, and the temperature of the intake air are input from the thermal flowmeter 30 to a control device 200. Further, an output of a throttle angle sensor 144 that measures the opening degree of the throttle valve 132 is input to the control device 200. Furthermore, an output of a rotation angle sensor 146 is input to the control device 200 in order to measure a position or a state of the engine piston 114, the intake valve 116, or the exhaust valve 118 of the internal combustion engine and a rotation speed of the internal combustion engine. Moreover, an output of an oxygen sensor 148 is input to the control device 200 in order to measure a mixture ratio between a fuel amount and an air amount from the state of the exhaust air EA.

The control device 200 calculates a fuel injection amount or an ignition timing on the basis of the flow amount, the humidity, and the temperature of the intake air output from the thermal flowmeter 30 and the rotation speed of the internal combustion engine output from the rotation angle sensor 146. On the basis of these calculation results, the fuel supply amount of the fuel injection valve 152 and the ignition timing of the ignition plug 154 are controlled. In fact, the fuel supply amount or the ignition timing is controlled on the basis of an intake air temperature measured by the thermal flowmeter 30, a change in throttle angle, a change in engine rotation speed, and an air fuel ratio measured by the oxygen sensor 148. The control device 200 further controls an amount of air bypassing the throttle valve 132 through an idle air control valve 156 in an idle operation state of the internal combustion engine so that the rotation speed of the internal combustion engine in the idle operation state is controlled.

The fuel supply amount or the ignition timing which is a key control amount of the internal combustion engine is calculated by using the output of the thermal flowmeter 30 as main parameters. Thus, it is important to improve the measurement accuracy of the thermal flowmeter 30, to suppress a change in measurement accuracy with time, and to improve the reliability thereof in order to improve the vehicle control accuracy or ensure the reliability thereof. Particularly, in recent years, there has been an extremely high demand of saving fuel and purifying an exhaust gas in the vehicle. In order to handle these demands, it is important to improve the measurement accuracy of the flow amount of the measurement object gas IA which is the intake air measured by the thermal flowmeter 30.

2. Appearance of Thermal Flowmeter and Attachment State Thereof

FIG. 2 illustrates an appearance of the thermal flowmeter 30. FIG. 2A is a front view of the thermal flowmeter 30, FIG. 2B is a left side view, FIG. 2C is a rear view, and FIG. 2D is a right side view.

The thermal flowmeter 30 includes a housing 302, a front cover 303, and a rear cover 304. The housing 302 includes a flange 312 which fixes the thermal flowmeter 30 to an intake body forming a main passage, an external connection portion (a connector portion) 305 which includes an external terminal electrically connected to an external device, and a measurement unit 310 which measures a flow amount. A sub-passage groove which forms a sub-passage is provided inside the measurement unit 310.

When the front cover 303 and the rear cover 304 of the thermal flowmeter 30 are covered, a casing with a sub-passage is formed. A circuit package 400 which includes a flow measurement element 602 measuring a flow amount of the measurement object gas IA flowing in the main passage or a temperature detection unit 452 measuring a temperature of the measurement object gas IA flowing in the main passage 124 is provided inside the measurement unit 310 (see FIGS. 3A and 3B).

Figure 2A:
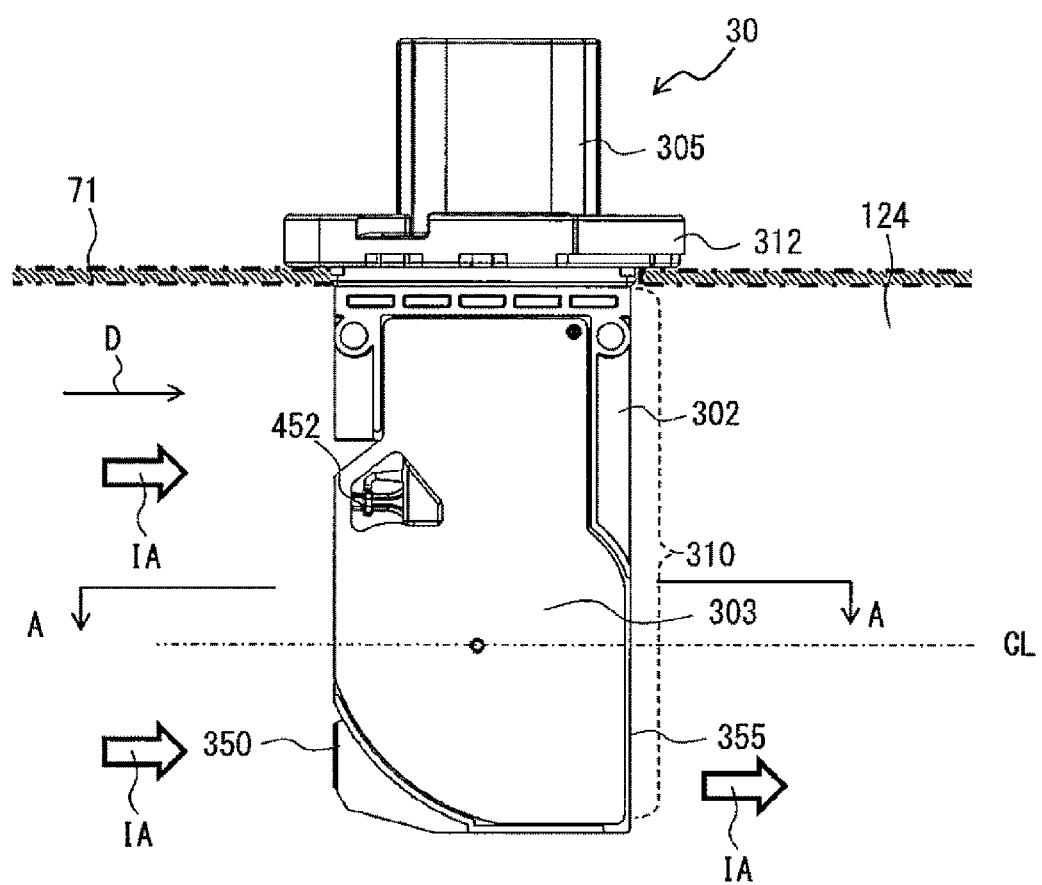
FIG. 2A is a front view illustrating an appearance of the thermal flowmeter according to a first embodiment of the invention.
Figure 3A:
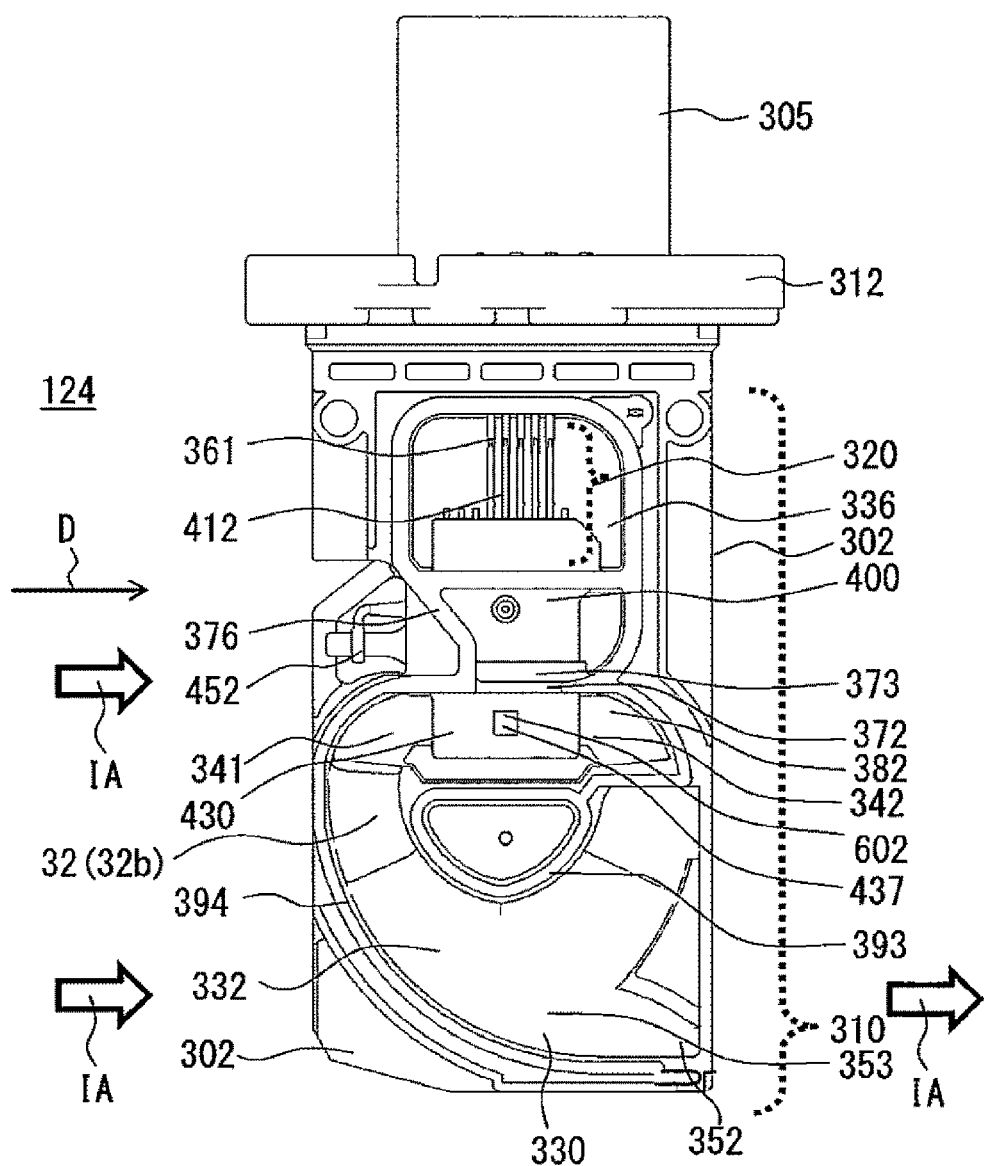
FIG. 3A is a front view illustrating a state of a housing in which a front cover is removed from the thermal flowmeter according to the first embodiment of the invention.
Figure 3B:
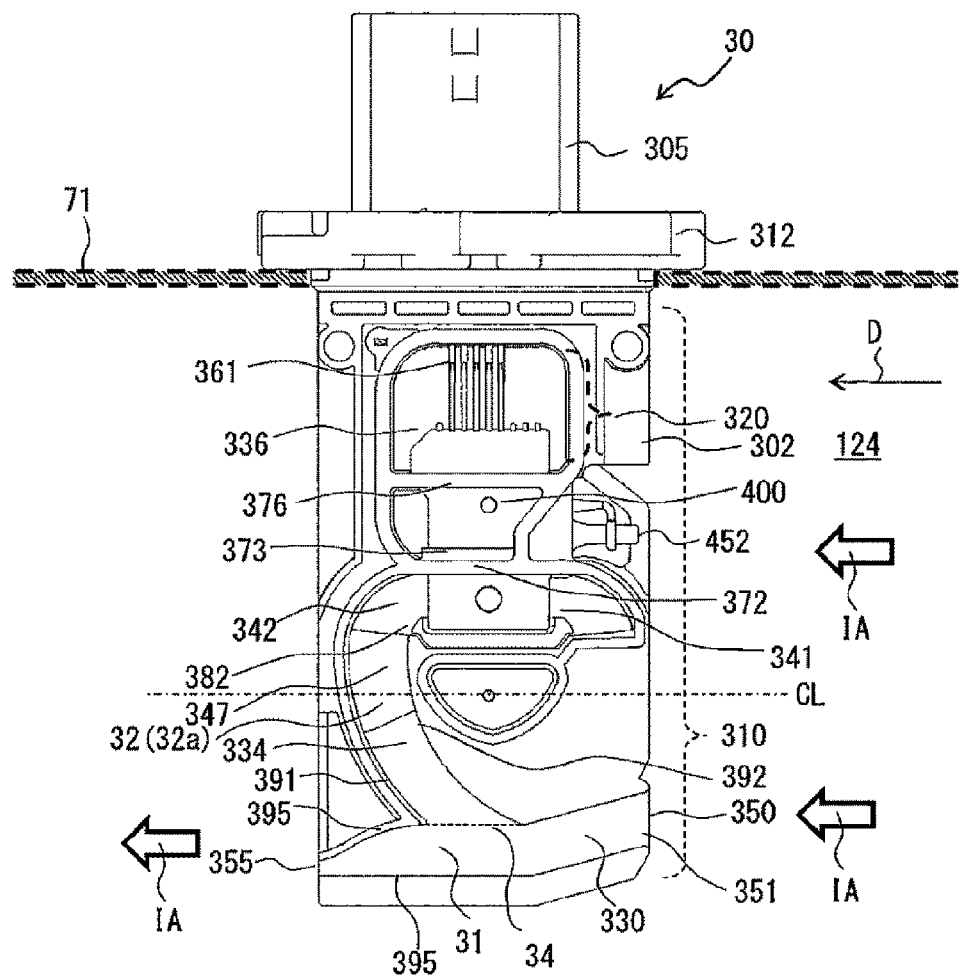
FIG. 3B is a rear view illustrating a state of a housing in which a rear cover is removed from the thermal flowmeter according to the first embodiment of the invention.

In the thermal flowmeter 30, the measurement unit 310 is supported inside the main passage in a cantilevered manner while the flange 312 is fixed to the intake body (the intake pipe) 71. FIGS. 2A and 3B illustrate the intake pipe 71 by a virtual line in order to clarify a positional relation between the thermal flowmeter 30 and the intake pipe 71.

The measurement unit 310 of the thermal flowmeter 30 is formed in a shape which extends from the flange 312 toward the center of the main passage 124 in the radial direction and a front end thereof is provided with a main intake opening 350 (see FIG. 2C) which takes a part of the measurement object gas IA which is the intake air into the sub-passage and a discharge opening 355 (see FIG. 2D) which returns the measurement object gas IA from the sub-passage to the main passage 124.

Since the main intake opening 350 of the thermal flowmeter 30 is provided at the front end side of the measurement unit 310 which extends from the flange 312 toward the center of the main passage in the radial direction, a gas which is separated from an inner wall face of the main passage can be taken into the sub-passage. Accordingly, since it is possible to avoid an influence of a temperature of the inner wall face of the main passage, it is possible to suppress deterioration in measurement accuracy of the flow amount or the temperature of the gas. Further, as will be described later, in the embodiment, the center of the main intake opening 350 is offset with respect to a center line CL following a direction D in which the measurement object gas IA of the main passage 124 flows.

Further, since a fluid resistance is large in the vicinity of the inner wall face of the main passage 124, a flow rate decreases compared to an average flow rate of the main passage. In the thermal flowmeter 30 of the embodiment, since the main intake opening 350 is provided at the front end of the thin and elongated measurement unit 310 extending from the flange 312 toward the center of the main passage, it is possible to take a gas having a high flow rate at the center portion of the main passage into the sub-passage (the measurement passage). Further, since the discharge opening 355 of the sub-passage is also provided at the front end of the measurement unit 310, it is possible to return a gas flowing through the sub-passage to the vicinity of the center portion of the main passage 124 in which the flow rate is high.

Figure 2B:
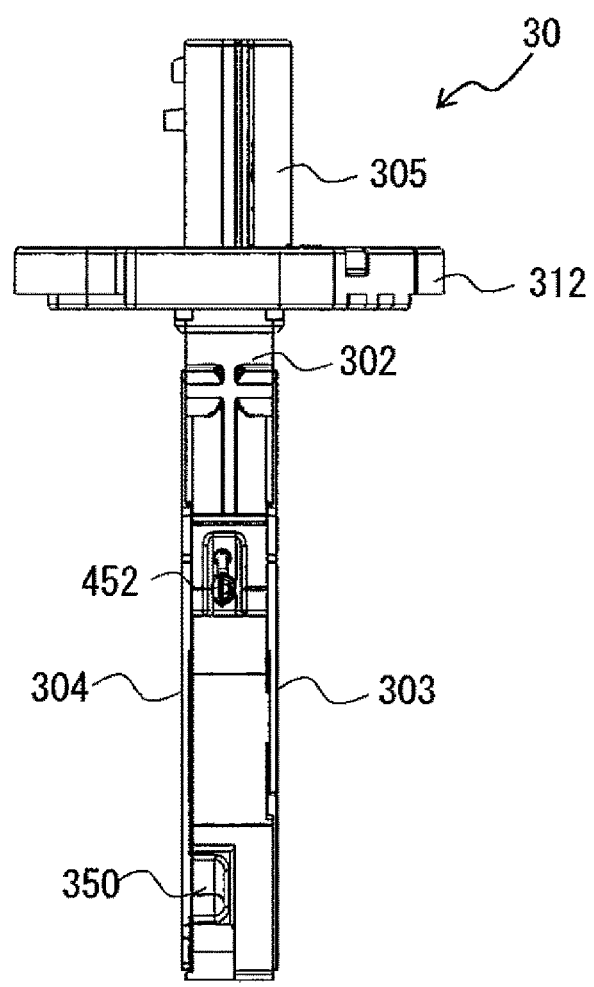
FIG. 2B is a left side view illustrating an appearance of the thermal flowmeter according to the first embodiment of the invention.
Figure 2C:
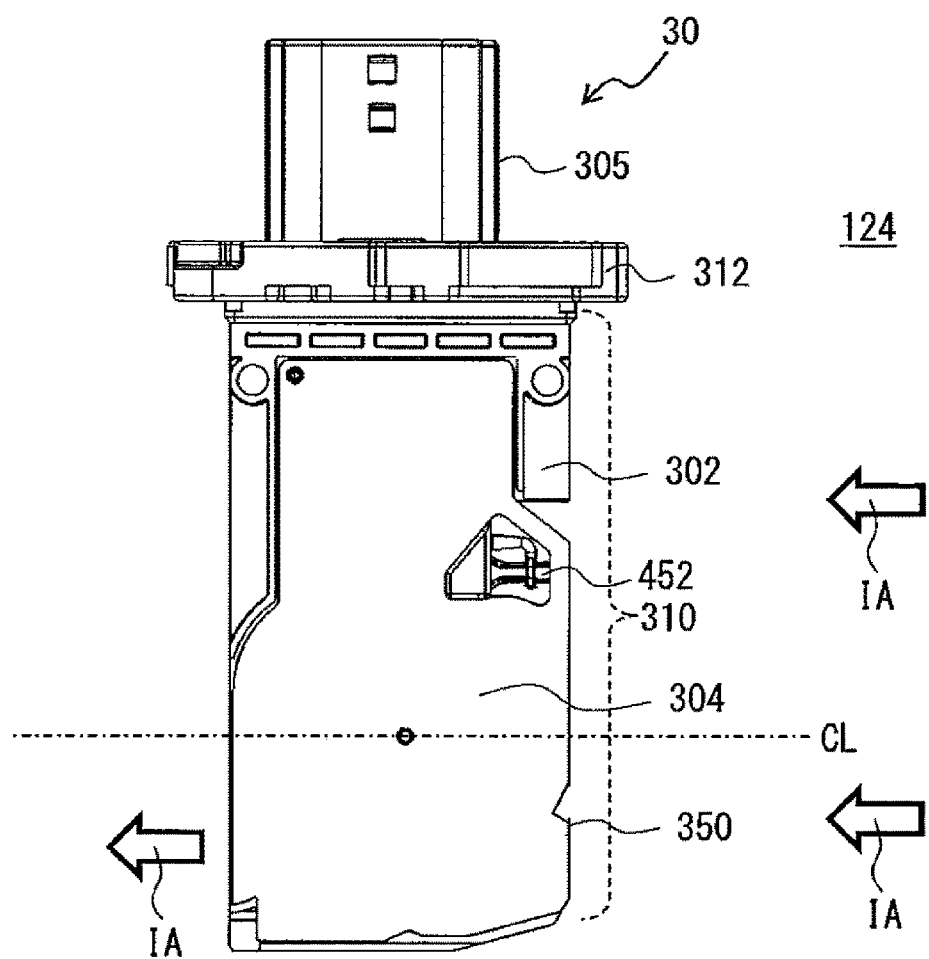
FIG. 2C is a rear view illustrating an appearance of the thermal flowmeter according to the first embodiment of the invention.
Figure 2D:
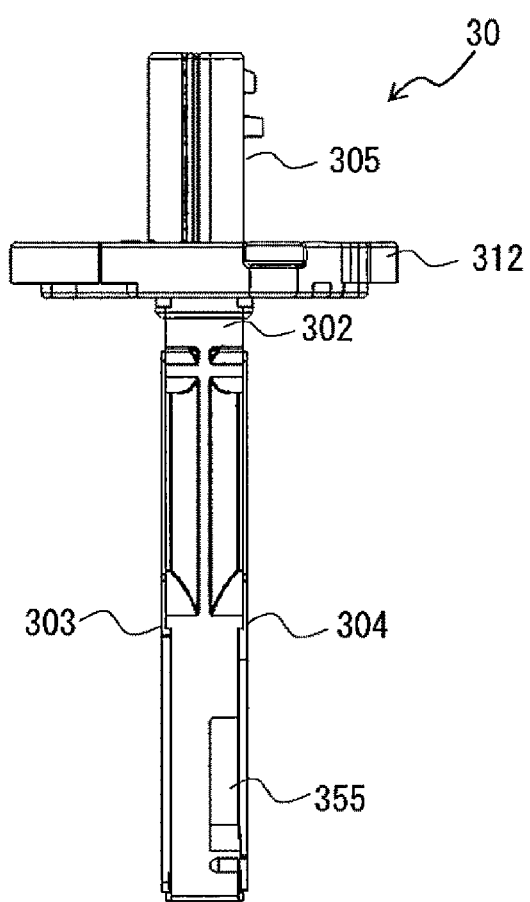
FIG. 2D is a right side view illustrating an appearance of the thermal flowmeter according to the first embodiment of the invention.

The measurement unit 310 is formed in a shape which extends along an axis directed toward the center from the outer wall of the main passage 124, but a width thereof is formed in a narrow shape as illustrated in FIGS. 2B and 2D. That is, the measurement unit 310 of the thermal flowmeter 30 is formed in a shape in which a side face has a small width and a front face is substantially rectangular. Accordingly, the thermal flowmeter 30 can include a sub-passage which has a small fluid resistance with respect to the measurement object gas IA and has a sufficient length.

The temperature detection unit 452 which measures the temperature of the measurement object gas IA is provided at a position in which an upstream outer wall inside the measurement unit 310 is recessed toward the downstream side at the center portion of the measurement unit 310 so as to have a shape which protrudes toward the upstream side from the upstream outer wall.

Each of the front cover 303 and the rear cover 304 is formed in a thin plate shape with a wide cooling face. For this reason, since an air resistance in the thermal flowmeter 30 is decreased, there is an effect in which a cooling operation is easily performed by the measurement object gas flowing in the main passage 124.

An external terminal and a correction terminal, which are not illustrated, are provided inside the external connection portion 305. The external terminal includes a terminal which outputs a temperature and a flow amount corresponding to a measurement result and a power terminal which supplies DC power. The correction terminal is a terminal which is used to store a correction value for the thermal flowmeter 30 in a memory inside the thermal flowmeter 30.

3. Sub-Passage and Circuit Package Inside Housing

Next, configurations of the sub-passage and the circuit package provided inside the housing 302 will be described with reference of FIGS. 3A and 3B. FIGS. 3A and 3B illustrate a state of the housing 302 in which the front cover 303 or the rear cover 304 is removed from the thermal flowmeter 30. FIG. 3A is a front view illustrating a state of a housing 302 in which a front cover 303 is removed from a thermal flowmeter according to a first embodiment of the invention and FIG. 3B is a rear view illustrating a state of a housing 302 in which a rear cover 304 is removed from the thermal flowmeter 30 according to the first embodiment of the invention.

A sub-passage groove for molding a sub-passage at the front end side of the measurement unit 310 is provided in the housing 302. A sub-passage 330 is a passage which is formed inside the thermal flowmeter 30 to take a part of the measurement object gas flowing in the main passage 124. In the embodiment, sub-passage grooves 332 and 334 are provided at both front and rear faces of the housing 302. When the front and rear faces of the housing 302 are covered by the front cover 303 and the rear cover 304, the continuous sub-passage 330 is formed at both faces of the housing 302. With such a structure, both a front sub-passage groove 332 and a rear sub-passage groove 334 are formed in a part of the housing 302 and a penetration hole 382 penetrating the housing 302 is formed to connect both grooves by the use of dies which are formed at both faces of the housing 302 in a step (a resin molding step) of molding the housing 302 by a second resin (a thermoplastic resin). Accordingly, the flow measurement element 602 of the circuit package 400 can be disposed at the penetration hole 382.

As illustrated in FIG. 3B, a part of the measurement object gas IA which flows in the main passage is taken from the main intake opening 350 into the rear sub-passage groove 334 and flows in the rear sub-passage groove 334. When the rear sub-passage groove 334 is covered by the rear cover 304, a part of upstream sides of a first passage 31 and a second passage 32 in the sub-passage 330 are formed in the thermal flowmeter 30. Here, the first passage 31 corresponds to a "discharge passage" of the invention and a passage (a sensor upstream passage 32a to be described later) which is located at the upstream side of the flow measurement element 602 in the second passage 32 corresponds to a "curved passage."

The first passage (discharge passage) 31 is a pollutant material discharge passage which is formed from the main intake opening 350 taking the measurement object gas IA flowing in the main passage 124 to the discharge opening 355 discharging a part of the taken measurement object gas IA. The second passage 32 is a flow amount measurement passage which is formed from the sub-intake opening 34 taking the measurement object gas IA flowing in the first passage 31 toward the flow measurement element 602. The main intake opening 350 is opened to an upstream face of the main passage 124, the discharge opening 355 is opened to a downstream face of the main passage 124, and an opening area of the discharge opening 355 is smaller than an opening area of the main intake opening 350. Accordingly, the measurement object gas IA can also easily flow from the main intake opening 350 to the second passage 32.

In the rear face sub-passage groove 334, a passage groove of the second passage 32 (the passage to the flow measurement element 602) is formed in a shape which becomes deeper as it goes in a flow direction. Then, the measurement object gas IA gradually moves toward the front cover 303 as the measurement gas flows along the groove. The rear sub-passage groove 334 is provided with a steep inclined portion 347 which becomes steeply deeper at an upstream portion 342 of the circuit package 400. A part of air having a small mass moves along the steep inclined portion 347 and flows toward a measurement flow passage face 430 illustrated in FIG. 4 at the upstream portion 342 in the penetration hole 382 of the circuit package 400. Meanwhile, since a path of a foreign material having a large mass cannot be abruptly changed due to a centrifugal force, the foreign material cannot flow along the steep inclined portion 347, but flows toward a measurement flow passage rear face 431 illustrated in FIG. 4. Subsequently, the air flows in the front sub-passage groove 332 illustrated in FIG. 3A through a downstream portion 341 in the penetration hole 382.

As described above, a portion including the measurement flow passage face 430 of the circuit package 400 is disposed inside a cavity of the penetration hole 382 and in the penetration hole 382, the rear sub-passage groove 334 and the front sub-passage groove 332 are connected to both left and right sides of the circuit package 400 with the measurement flow passage face 430.

As illustrated in FIG. 3A, the air which is the measurement object gas IA flows from the upstream portion 342 along the measurement flow passage face 430 in the penetration hole 382. At this time, the flow amount of the measurement object gas IA is measured by the transmission of heat of the flow measurement element 602 measuring the flow amount through a measurement front face (a heat transmission face) 437 which is provided at the flow measurement element 602 and is exposed into the second passage 32. Additionally, the flow amount measurement principle may be a general measurement principle of the thermal flowmeter. Here, a measurement configuration is not particularly limited as long as the flow amount of the measurement object gas flowing in the main passage can be measured on the basis of the measurement value measured by the flow measurement element 602 of the circuit package 400 as in the embodiment.

Both the measurement object gas IA having passed through the measurement flow passage face 430 and the air flowing from the downstream portion 341 of the circuit package 400 to the front sub-passage groove 332 flow along the front sub-passage groove 332 and are discharged from an exit groove 353 of the second passage 32 to the main passage 124 through the discharge opening facing the downstream face of the main passage 124.

In the embodiment, the second passage 32 which is formed by the rear sub-passage groove 334 is directed toward a flange direction from a front end of the housing 302 while depicting a curve and the measurement object gas IA flowing in the sub-passage 330 at a position closest to the flange becomes a flow opposite to the flow of the main passage 124. At the penetration hole 382 which becomes a part of the flow in the opposite direction, a sensor upstream passage (a curved passage) 32a which is provided at the rear face side of the second passage 32 provided at one side of the housing 302 is connected to a sensor downstream passage 32b which is provided at the front face side of the second passage 32 provided at the other side thereof. The sensor upstream passage (the curved passage) 32a is a passage which is bent in one direction toward the flow measurement element 602 so that the measurement object gas IA taken from the main passage 124 flows to the flow measurement element 602 and includes a part of the penetration hole 382 at the upstream side of the flow measurement element 602.

That is, in the embodiment, a front end side of the circuit package 400 is disposed inside a cavity of the penetration hole 382. A space of the upstream portion 342 located at the upstream side of the circuit package 400 and a space of the downstream portion 341 located at the downstream side of the circuit package 400 are included in the penetration hole 382 and as described above, the penetration hole 382 is drilled to penetrate the front and rear face sides of the housing 302. Accordingly, as described above, the sensor upstream passage 32a which is formed by the front sub-passage groove 332 at the front face side of the housing 302 communicates with the sensor downstream passage 32b which is formed by the rear sub-passage groove 334 at the rear face side at the penetration hole 382. The sensor downstream passage 32b is a passage which is bent in one direction toward the discharge opening 355 so that the measurement object gas IA having passed through the flow measurement element 602 flows to the discharge opening 355 and includes a part of a penetration hole 382 located at the downstream side of the flow measurement element 602.

Figure 4:
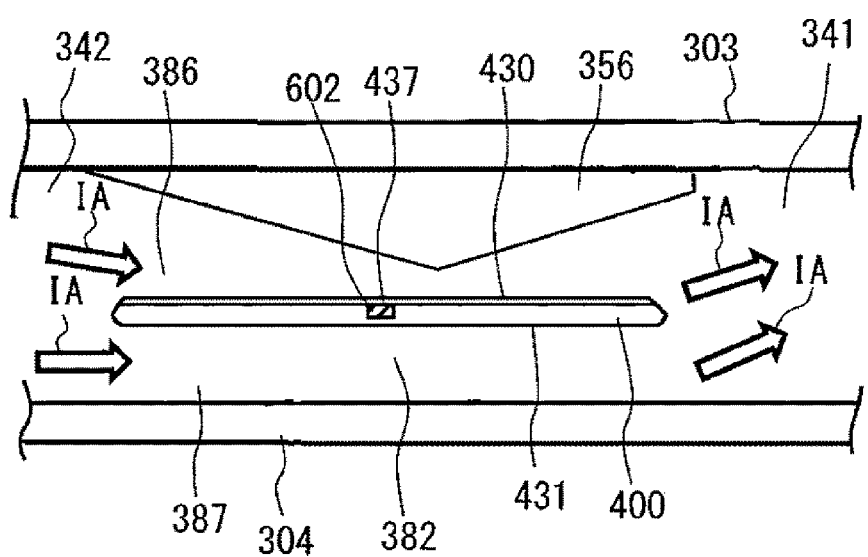
FIG. 4 is a cross-sectional view taken along a line A-A of FIG. 2A.

Further, as illustrated in FIG. 4, a space near the measurement flow passage face 430 and a space near the measurement flow passage rear face 431 are defined by the circuit package 400 inserted into the housing 302, but is not defined by the housing 302. One space which is formed by the space of the upstream portion 342, the space of the downstream portion 341, the space near the measurement flow passage face 430, and the space near the measurement flow passage rear face 431 is continuously formed at the front and rear faces of the housing 302 and the circuit package 400 which is inserted into the housing 302 protrudes to one space in a cantilevered manner. With such a configuration, it is possible to mold the sub-passage groove at both faces of the housing 302 by one resin molding step and to perform a molding operation in accordance with a structure of connecting the sub-passage grooves at both faces.

The circuit package 400 is fixed to be buried in the housing 302 by fixing portions 372, 373, and 376 of the housing 302 molded by the second resin. Such a fixing structure can be mounted on the thermal flowmeter 30 in such a manner that the housing 302 is molded by the second resin and the circuit package 400 is insert-molded in the housing 302. Additionally, in the embodiment, the first resin is a resin for molding the circuit package 400 and the second resin is a resin for molding the housing 302.

A front sub-passage inner peripheral wall (a second passage wall) 393 and a front sub-passage outer peripheral wall (a second passage wall) 394 are provided at both sides of the front sub-passage groove 332 and front ends of the front sub-passage inner peripheral wall 393 and the front sub-passage outer peripheral wall 394 in the height direction adhere to an inner face of the front cover 303 so that a part of the sensor downstream passage 32b of the housing 302 is formed.

The measurement object gas IA which is taken from the main intake opening 350 and flows in the first passage 31 formed by the rear sub-passage groove 334 flows from the right side to the left side in FIG. 3B. Here, a part of the taken measurement object gas IA flows to be distributed to the sub-intake opening 34 of the second passage 32 formed to be branched from the first passage 31. The flowing measurement object gas IA flows toward a flow passage 386 which is formed by a front face of the measurement flow passage face 430 of the circuit package 400 and a protrusion 356 provided in the front cover 303 through the upstream portion 342 of the penetration hole 382 (see FIG. 4).

The other measurement object gas IA flows toward a flow passage 387 which is formed by the measurement flow passage rear face 431 and the rear cover 304. Subsequently, the measurement object gas IA having passed through the flow passage 387 moves to the front sub-passage groove 332 through the downstream portion 341 of the penetration hole 382 and is merged with the measurement object gas IA flowing in the flow passage 386. The merged measurement object gas IA flows in the front sub-passage groove 332 and is discharged from the discharge opening 355 formed in the housing to the main passage 124 through an exit 352.

The sub-passage groove is formed so that the measurement object gas IA led from the rear sub-passage groove 334 to the flow passage 386 through the upstream portion 342 of the penetration hole 382 is bent more than the flow passage led to the flow passage 387. Accordingly, a material having a large mass such as a garbage included in the measurement object gas IA is accumulated in the flow passage 387 which is bent to a small degree.

The protrusion 356 in the flow passage 386 forms a diaphragm so that the measurement object gas IA becomes a laminar flow having a small vortex. Further, the protrusion 356 increases the flow rate of the measurement object gas IA. Accordingly, the measurement accuracy is improved. The protrusion 356 is formed at the front cover 303 which is a cover facing the measurement face exposure portion 436 of the flow measurement element 602 provided at the measurement flow passage face 430.

Here, as illustrated in FIG. 3B, the rear sub-passage groove 334 is formed by a first passage wall 395, a rear sub-passage inner peripheral wall (a second passage wall) 392, and a rear sub-passage outer peripheral wall (a second passage wall) 391 which are provided to face one another. When front ends of the rear sub-passage inner peripheral wall 392 and the rear sub-passage outer peripheral wall 391 in the height direction adhere to the inner face of the rear cover 304, a part of the sensor upstream passage (the curved passage) 32a of the second passage 32 and the first passage 31 of the housing 302 are formed.

As illustrated in FIGS. 3A and 3B, a cavity portion 336 is formed between a portion provided with the sub-passage groove and the flange 312 in the housing 302. A terminal connection portion 320 which connects a lead terminal 412 of the circuit package 400 and the connection terminal 306 of the external connection portion 305 is provided inside the cavity portion 336. A lead terminal 412 and a connection terminal 306 (an inner end 361) are electrically connected to each other by spot-welding or laser-welding.

4. Resistance Portion of Sub-Passage 220

Figure 5:
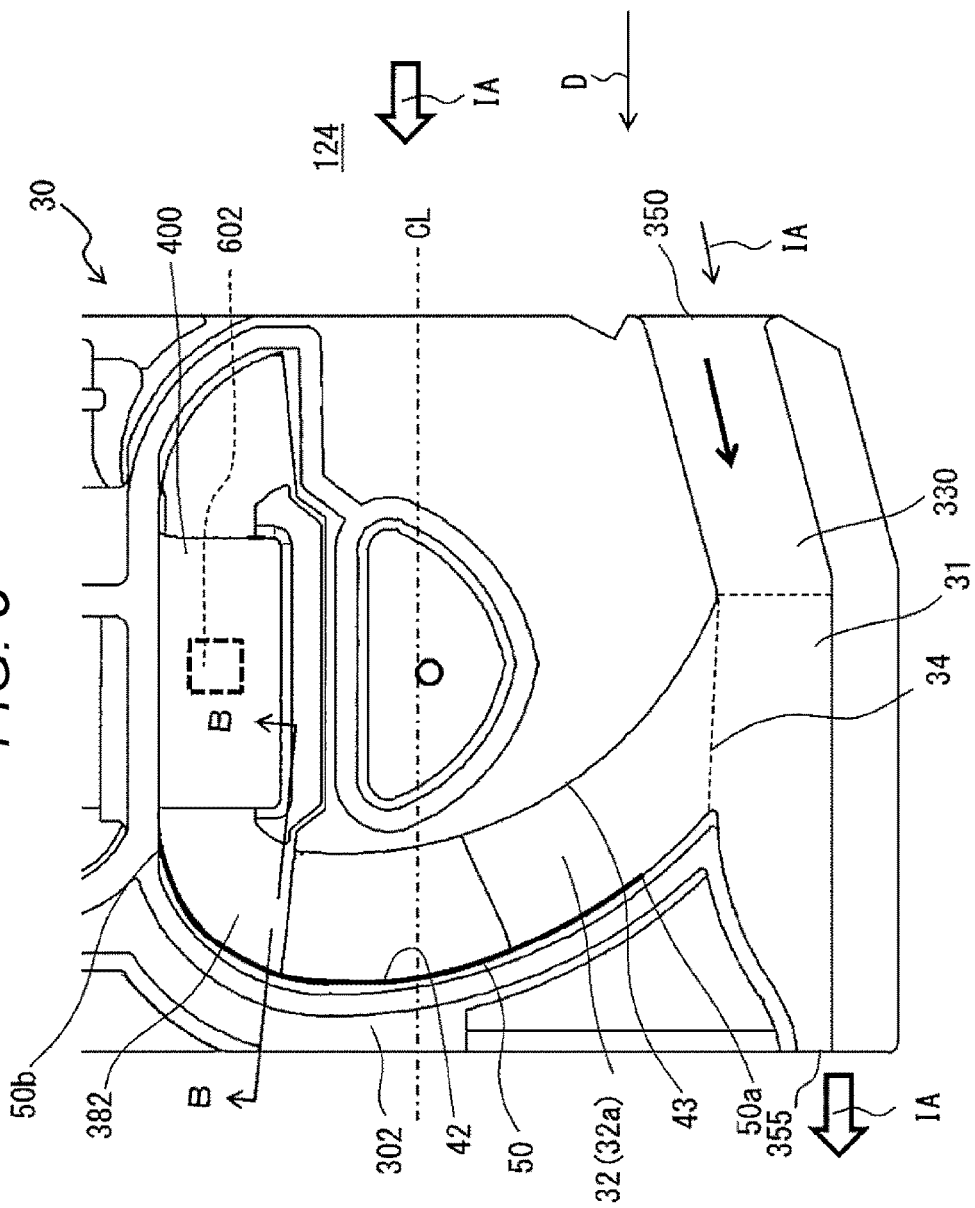
FIG. 5 is a main enlarged view of the sub-passage illustrated in FIG. 3B.

FIG. 5 is a main enlarged view of the sub-passage illustrated in FIG. 3B. Further, FIG. 6 is a cross-sectional view taken along a line B-B of FIG. 5, FIG. 7(a) is a diagram illustrating a relation between pressure loss and a flow rate distribution inside a curved passage of a sub-passage of a thermal flowmeter of the related art, and FIG. 7(b) is a diagram illustrating a relation between pressure loss and a flow rate distribution inside a curved passage of the sub-passage of the thermal flowmeter illustrated in FIG. 6.

Figure 6:
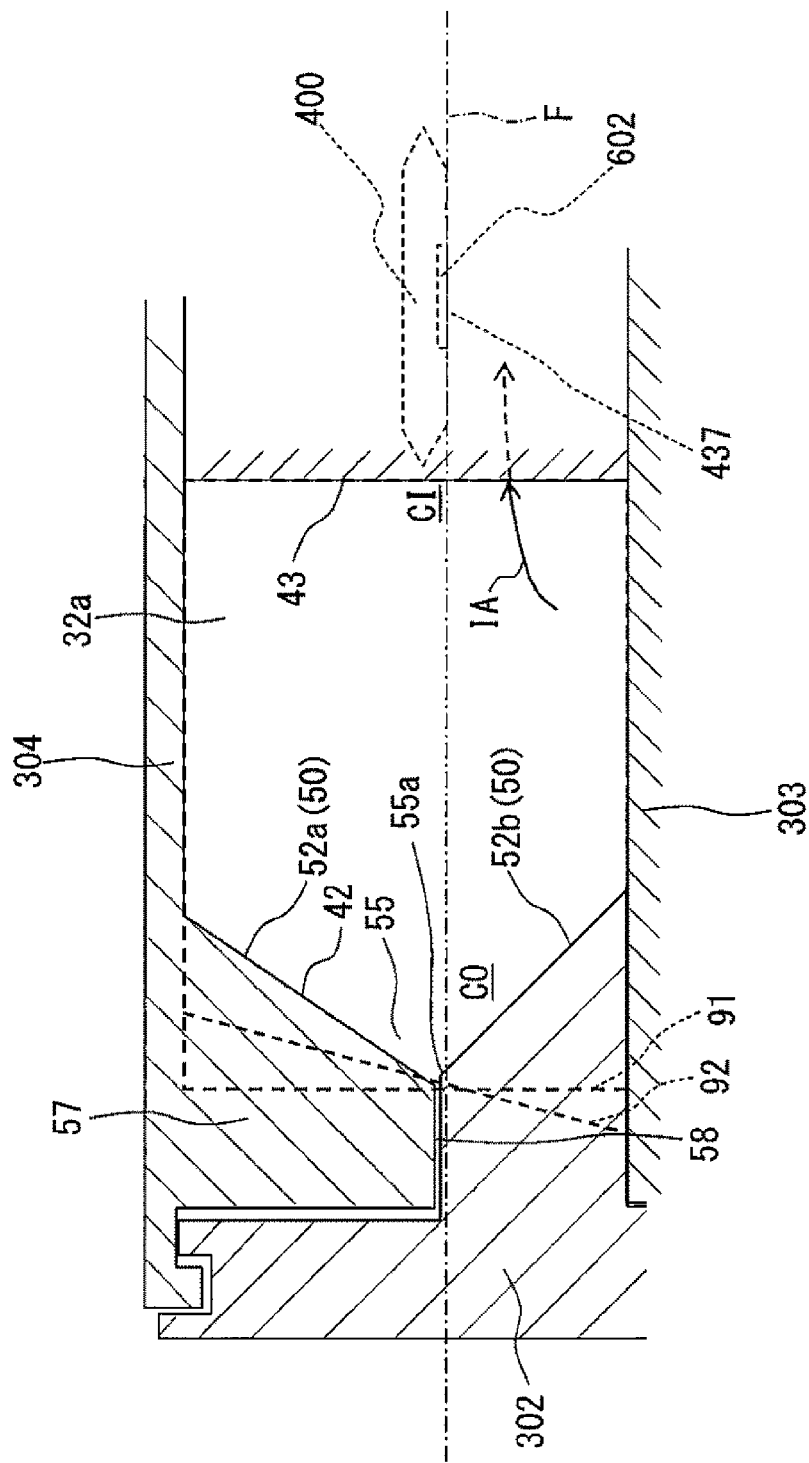
FIG. 6 is a cross-sectional view taken along a line B-B of FIG. 5.
Figure 7:
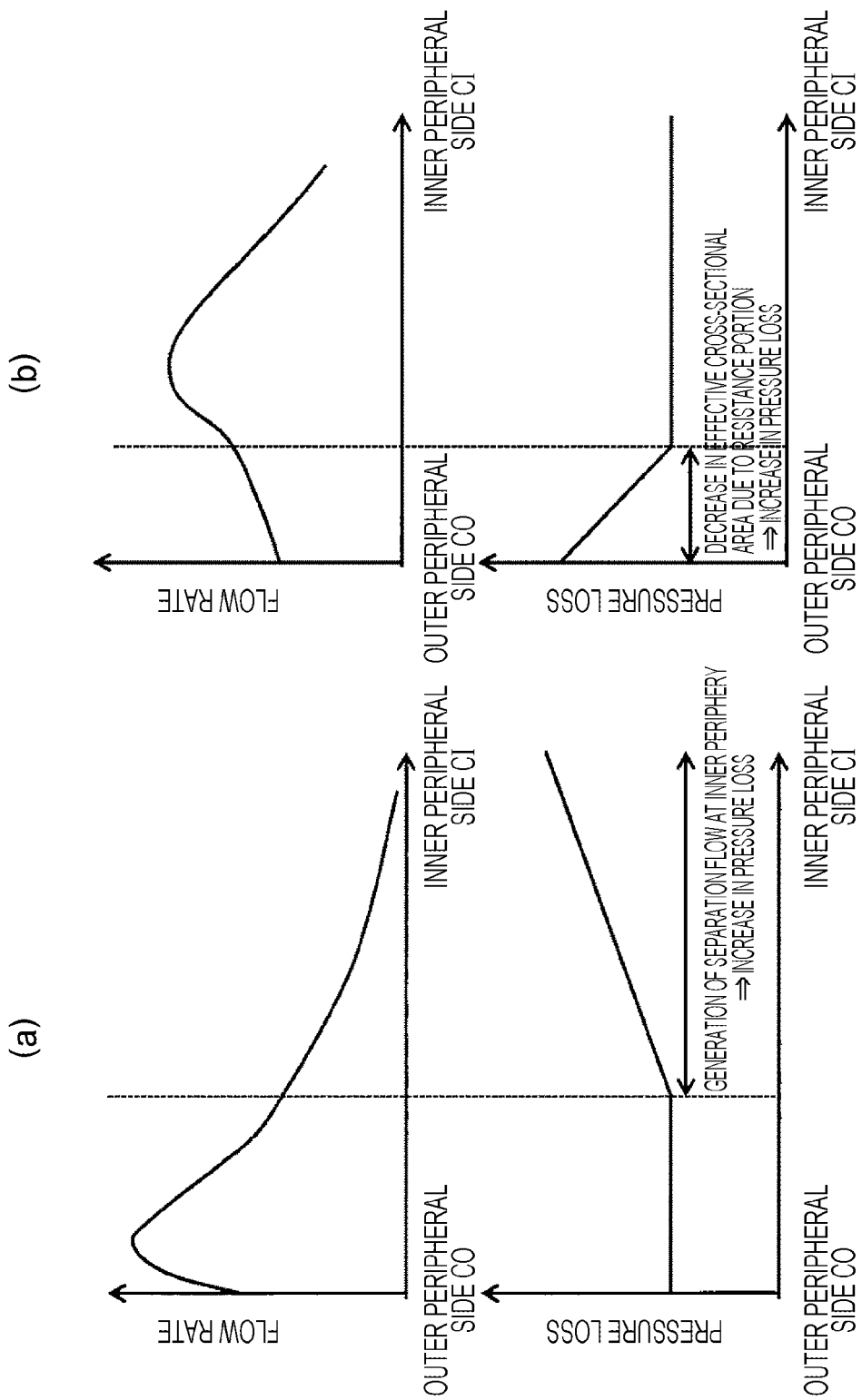
FIG. 7(a) is a diagram illustrating a relation between pressure loss and a flow rate distribution inside a curved passage of a sub-passage of a thermal flowmeter of the related art and FIG. 7(b) is a diagram illustrating a relation between pressure loss and a flow rate distribution inside a curved passage of a sub-passage of the thermal flowmeter illustrated in FIG. 6.

As illustrated in FIGS. 5 and 6, as described above, the sub-passage 330 of the thermal flowmeter 30 according to the embodiment includes the curved passage (the sensor upstream passage) 32a which is bent toward the flow measurement element 602 so that the measurement object gas IA taken from the main passage 124 flows to the flow measurement element 602.

The curved passage 32a is provided with a resistance portion 50 which applies a resistance to the flow of the measurement object gas IA flowing at the outer peripheral side CO so that the pressure loss of the measurement object gas IA flowing at the outer peripheral side CO of the curved passage 32a becomes higher than that of the inner peripheral side CI of the curved passage 32a (which will be described in detail by referring to FIG. 7(b)). The resistance portion 50 is formed along the outer peripheral wall face 42 of the outer peripheral side CO of the curved passage 32a illustrated in FIG. 5. As illustrated in FIG. 5, an upstream end 50a of the resistance portion 50 is formed at the outer peripheral wall face 42 near the flow measurement element 602 in relation to the sub-intake opening 34 and a downstream end 50b of the resistance portion 50 is formed to the upstream outer peripheral wall face 42 of the flow measurement element 602 forming the penetration hole 382 (see a bold line of FIG. 5).

As illustrated in FIG. 6, in the embodiment, the resistance portion 50 corresponds to a pair of opposite inclined faces 52a and 52b which are formed at the outer peripheral wall face 42 of the outer peripheral side CO of the curved passage 32a in the flow direction of the measurement object gas IA so that a resistance is applied to the flow of the measurement object gas IA flowing at the outer peripheral side CO. Each of the inclined faces 52a and 52b is inclined with respect to a virtual plane F following the measurement front face 437 of the flow measurement element 602.

Here, one inclined face 52a is formed at the front face of the protrusion portion 57 provided at the inner face of the rear cover 304 and the other inclined face 52b is formed at a wall face of the rear sub-passage outer peripheral wall 391 (see FIG. 3B) of the housing 302 and a wall face forming the penetration hole 382 continuous thereto. A gap 58 is formed between one inclined face 52a and the other inclined face 52b. Specifically, the gap 58 is formed in the same direction as the extension direction of the virtual plane F. Since the gap 58 is provided, it is possible to further increase the pressure loss of the measurement object gas IA flowing at the outer peripheral side CO of the curved passage 32a compared to the inner peripheral side CI of the curved passage 32a.

Further, in the embodiment, the pair of inclined faces 52a and 52b is formed so that the vicinity of the bottom portion 55a of a groove portion 55 formed by the pair of opposite inclined faces 52a and 52b is located on the virtual plane F.

Incidentally, in the related art, since an outer peripheral wall face 91 which is orthogonal to the virtual plane F or a dust prevention inclined face 92 which is inclined in one direction is provided as indicated by a dashed line of FIG. 6, a separation flow (a separation vortex) is generated in the vicinity of the inner peripheral wall face 43. Accordingly, as illustrated in FIG. 7(a), the pressure loss of the measurement object gas IA flowing at the inner peripheral side CI increases compared to the outer peripheral side CO. As a result, the measurement object gas IA flows to the outer peripheral side CO compared to the inner peripheral side CI and thus the flow rate of the measurement object gas IA flowing at the outer peripheral side CO becomes fast. Accordingly, the flow of the measurement object gas IA directed toward the flow measurement element 602 is biased, a bias of a flow in the event of an excessive flow during a pulsation changes, and the flow rate of the measurement object gas IA on the flow measurement element 602 becomes different compared to the non-transient period. As a result, a measurement error occurs in the flow measurement element 602 in the event of a pulsation.

Here, in the embodiment, since the resistance portion 50 is provided, an effective cross-sectional area of the measurement object gas IA flowing to the outer peripheral side CO is decreased so that a resistance is applied to the flow of the measurement object gas IA flowing at the outer peripheral side CO. Accordingly, as illustrated in FIG. 7(b), the pressure loss of the measurement object gas IA flowing at the outer peripheral side CO of the curved passage 32a can be increased compared to the inner peripheral side CO. Accordingly, since a separation flow (a separation vortex) of the measurement object gas IA generated in the vicinity of the inner peripheral wall face 43 is reduced, it is possible to suppress the flow of the measurement object gas IA flowing in the curved passage 32a from being biased to the outer peripheral side CO.

Further, in the embodiment, since the pair of opposite inclined faces 52a and 52b is provided, it is possible to increase the pressure loss of the measurement object gas IA flowing in the vicinity of the groove portion 55 formed by the inclined faces 52a and 52b. Accordingly, it is also possible to reduce a bias of the flow of the measurement object gas IA in a direction perpendicular to the virtual plane F, that is, the thickness direction of the flowmeter. Particularly, since the pair of inclined faces 52a and 52b is formed so that the vicinity of the bottom portion 55a of the groove portion 55 is located on the virtual plane F, it is possible to uniformly adjust the flow rate distribution of the measurement object gas IA flowing in the vicinity of the flow measurement element 602.

Figure 8:
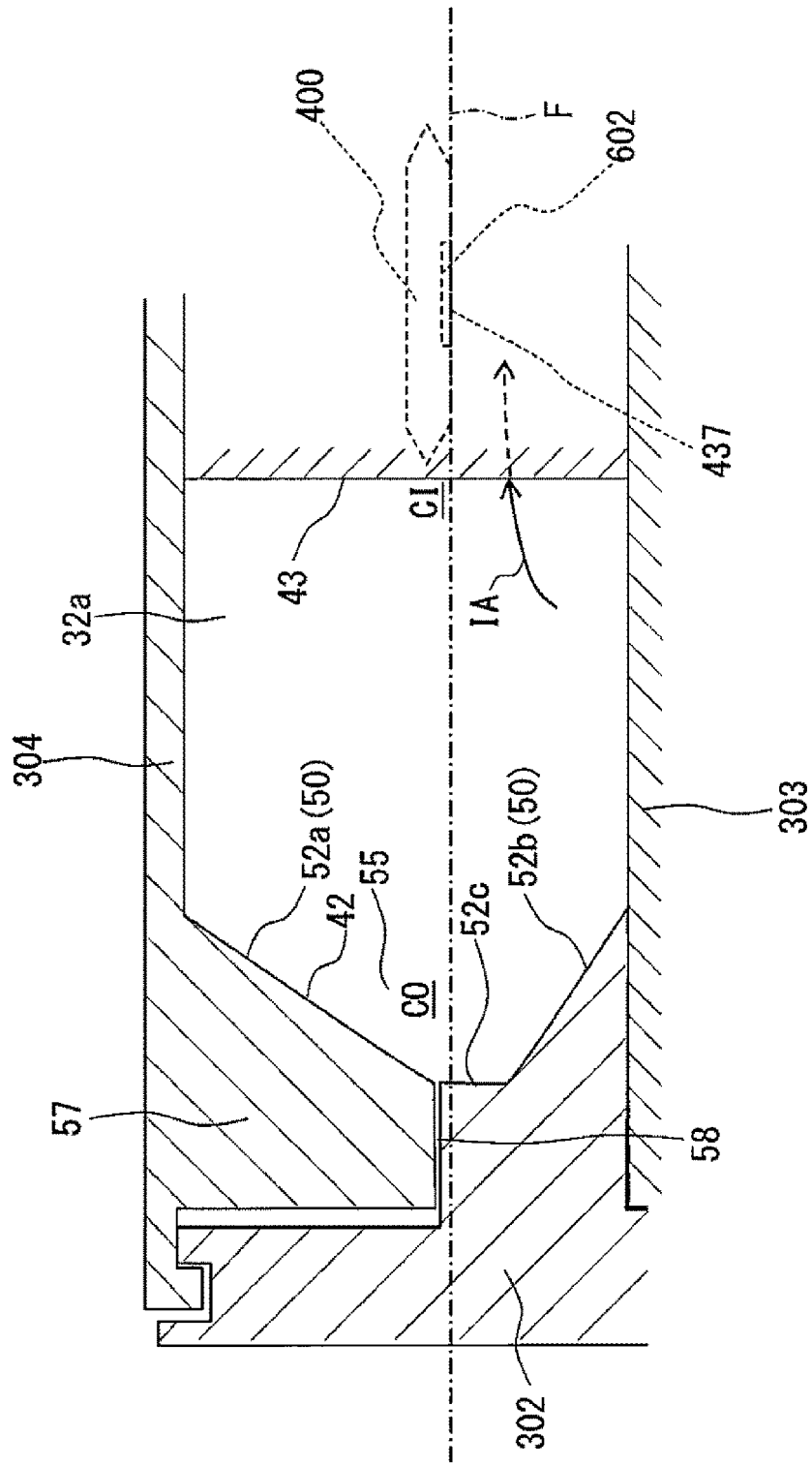
FIG. 8 is a modified example of the curved passage of the sub-passage of the thermal flowmeter illustrated in FIG. 6.
Figure 9:
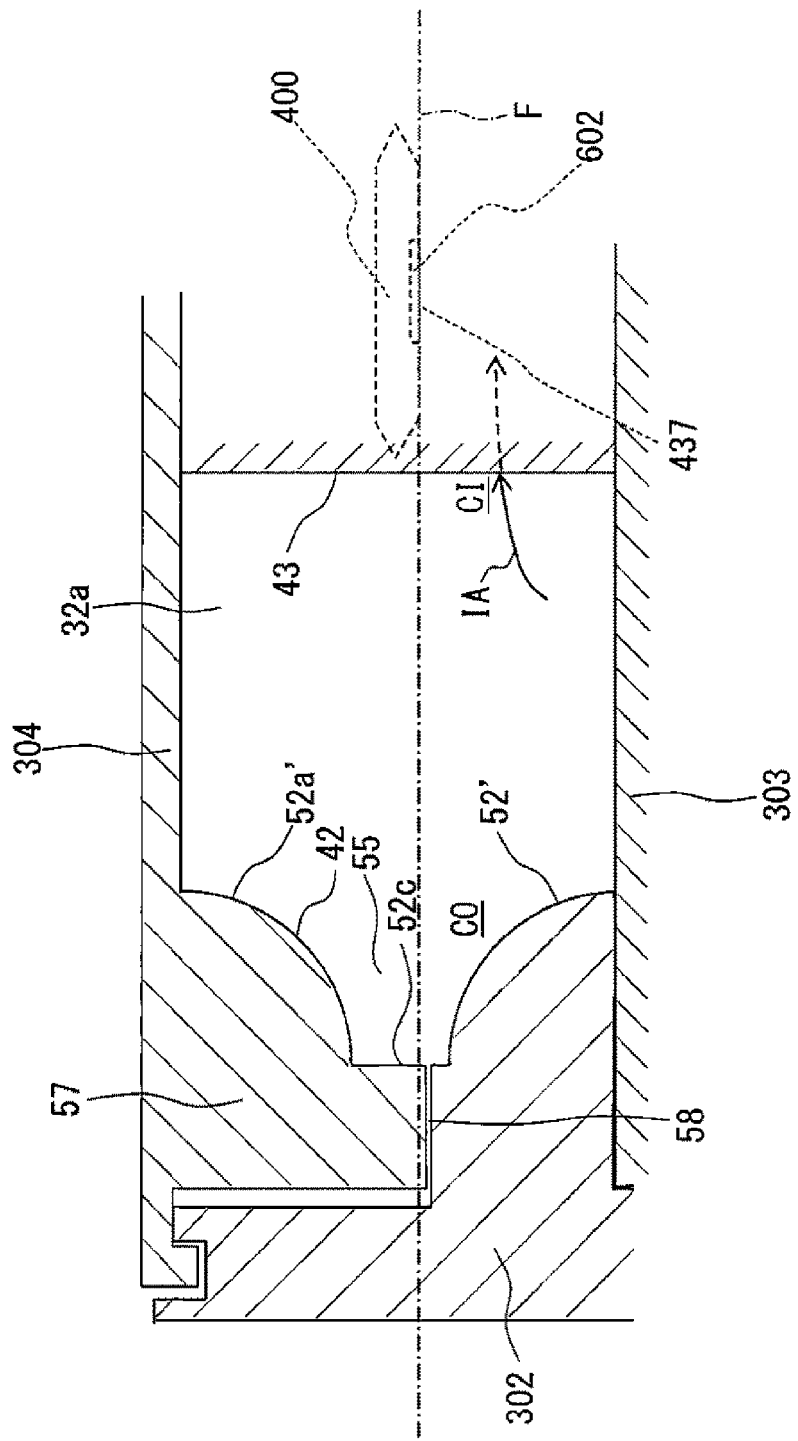
FIG. 9 is another modified example of the curved passage of the sub-passage of the thermal flowmeter illustrated in FIG. 6.
Figure 10:
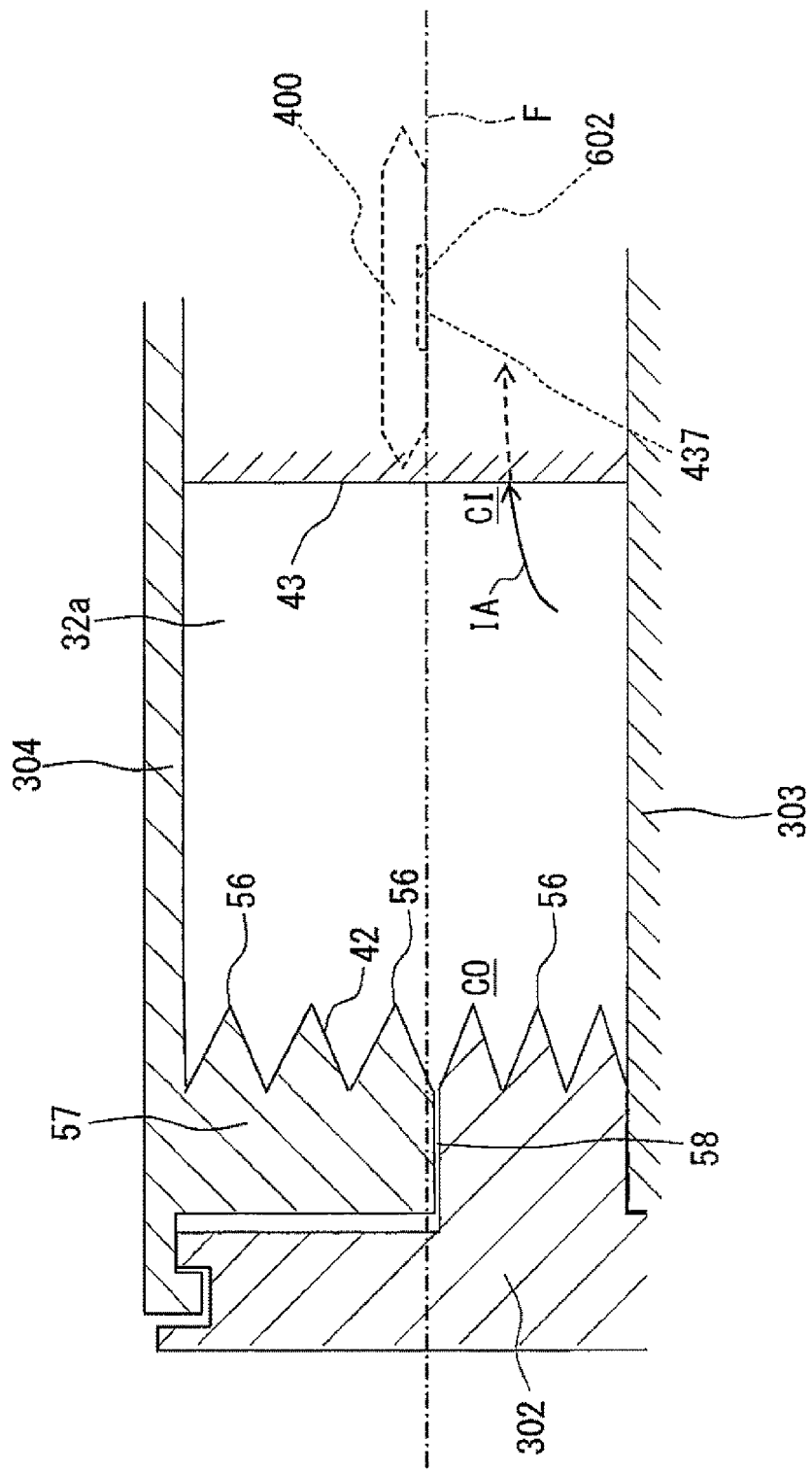
FIG. 10 is still another modified example of the curved passage of the sub-passage of the thermal flowmeter illustrated in FIG. 6.

FIGS. 8 to 10 are modified examples of the curved passage of the sub-passage of the thermal flowmeter illustrated in FIG. 6. For example, as illustrated in FIG. 8, even in the modified example, as in the above-described embodiment, the pair of opposite inclined faces 52a and 52b is formed at the outer peripheral wall face 42 of the outer peripheral side CO of the curved passage 32a following the flow direction of the measurement object gas IA so that a resistance is applied to the flow of the measurement object gas IA flowing at the outer peripheral side CO and the gap 58 is formed between the inclined faces 52a and 52b. Here, a bottom face 52c of the groove portion 55 is formed between the inclined faces 52a and 52b and the bottom face 52c is a face which is orthogonal to the virtual plane F. In the modified example, the pair of opposite inclined faces 52a and 52b is inclined with respect to the virtual plane F so that the virtual plane F is interposed therebetween. Further, the bottom face 52c extends toward the upside of the measurement front face 437 of the flow measurement element 602 (that is, the side of the front cover 303 in relation to the measurement front face 435) from the virtual plane F.

According to the modified example, since the pair of opposite inclined faces 52a and 52b is inclined with respect to the virtual plane F so that the virtual plane F is interposed therebetween, it is possible to increase the pressure loss of the measurement object gas IA flowing in the groove portion 55. Particularly, since the bottom face 52c of the groove portion 55 is located on the virtual plane F, it is possible to further uniformly adjust the flow rate distribution of the measurement object gas IA flowing in the measurement front face 437 of the flow measurement element 602. Further, since the bottom face 52c of the groove portion 55 extends toward the upside of the measurement front face 437 of the flow measurement element 602, it is possible to further uniformly adjust the flow rate distribution of the measurement object gas IA flowing in the measurement front face 437 of the flow measurement element 602.

In the embodiment, the pair of inclined faces 52a and 52b corresponds to planar inclined faces (see FIGS. 6 and 8). For example, as illustrated in FIG. 9, even when the pair of inclined faces corresponds to inclined faces 52a' and 52b' serving as convex faces, it is possible to improve the pressure loss of the outer peripheral side CO compared to the inner peripheral side CI by applying a resistance to the flow of the measurement object gas IA flowing at the outer peripheral side CO of the curved passage 32a. Accordingly, it is possible to suppress the flow of the measurement object gas IA flowing in the curved passage 32a from being biased to the outer peripheral side CO.

Further, if a resistance can be applied to the flow of the measurement object gas IA flowing at the outer peripheral side CO so that the pressure loss of the measurement object gas IA flowing at the outer peripheral side CO of the curved passage 32a becomes higher than that of the inner peripheral side CI of the curved passage 32a, for example, as illustrated in FIG. 10, a plurality of convex claw portions 56 may be provided at the outer peripheral wall face 42 of the outer peripheral side CO of the curved passage 32a along the flow direction of the measurement object gas IA.

Figure 11:
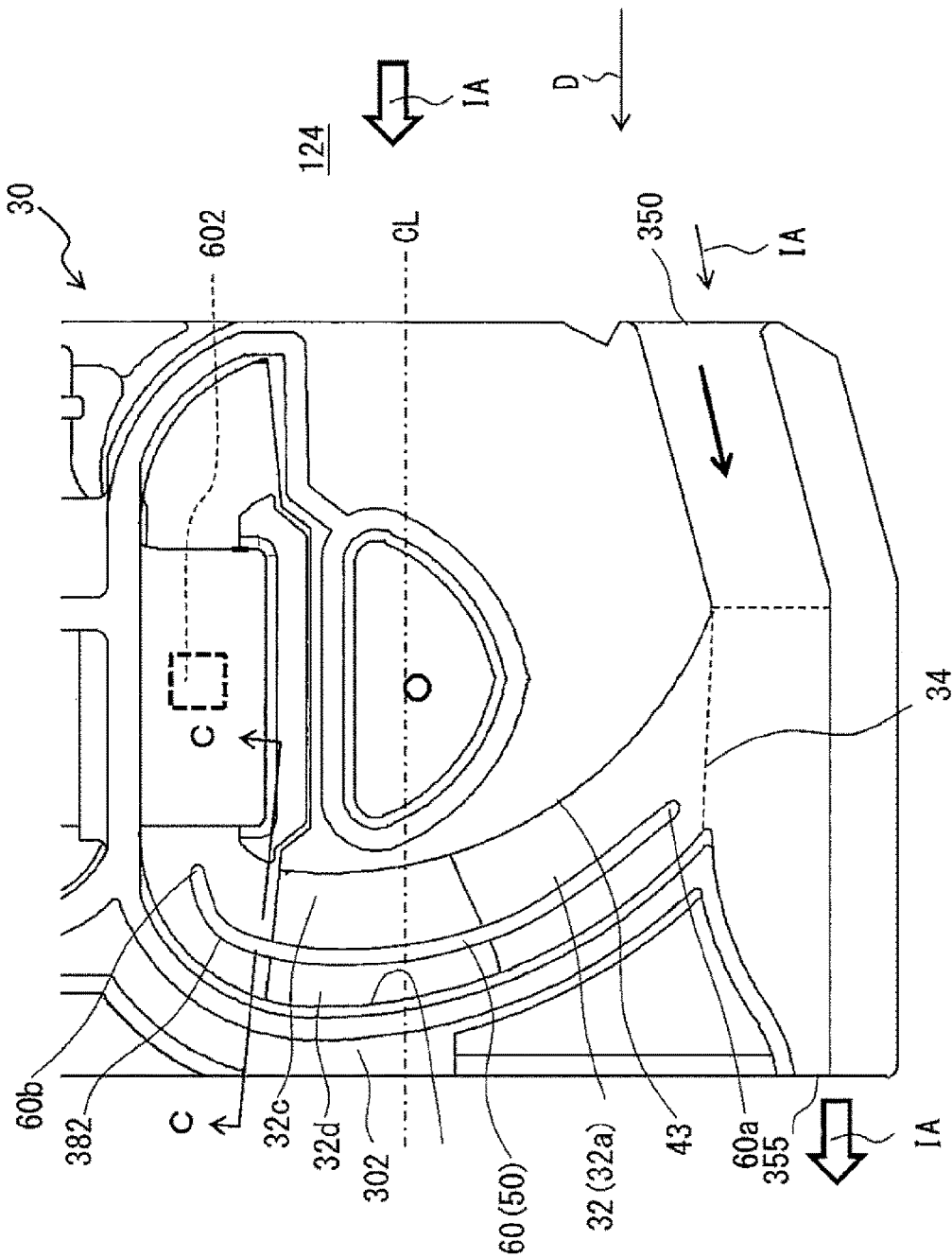
FIG. 11 is a main enlarged view of a sub-passage according to a second embodiment corresponding to a main enlarged view of the sub-passage illustrated in FIG. 3B.
Figure 12:
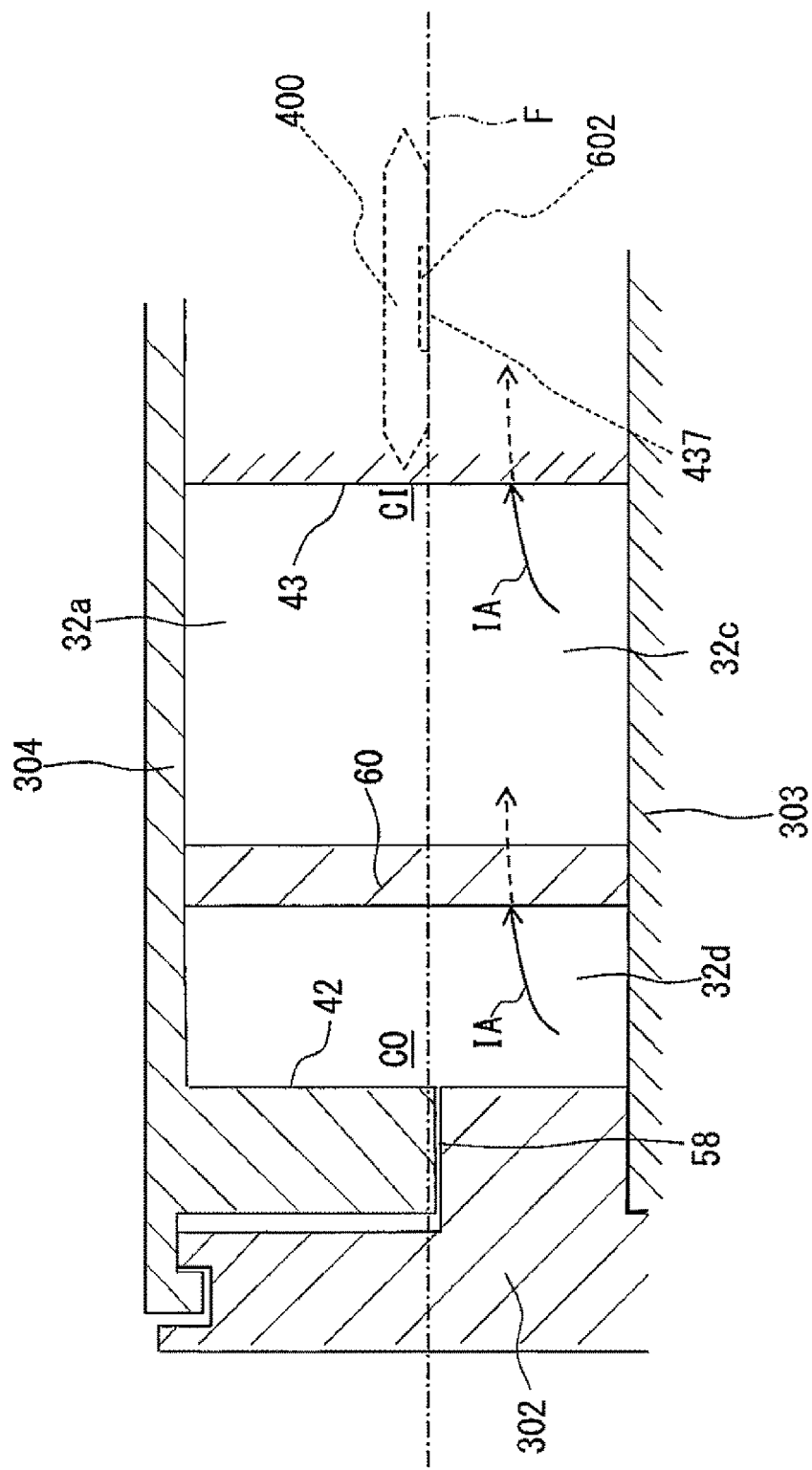
FIG. 12 is a cross-sectional view taken along a line C-C of FIG. 11.
Figure 13:
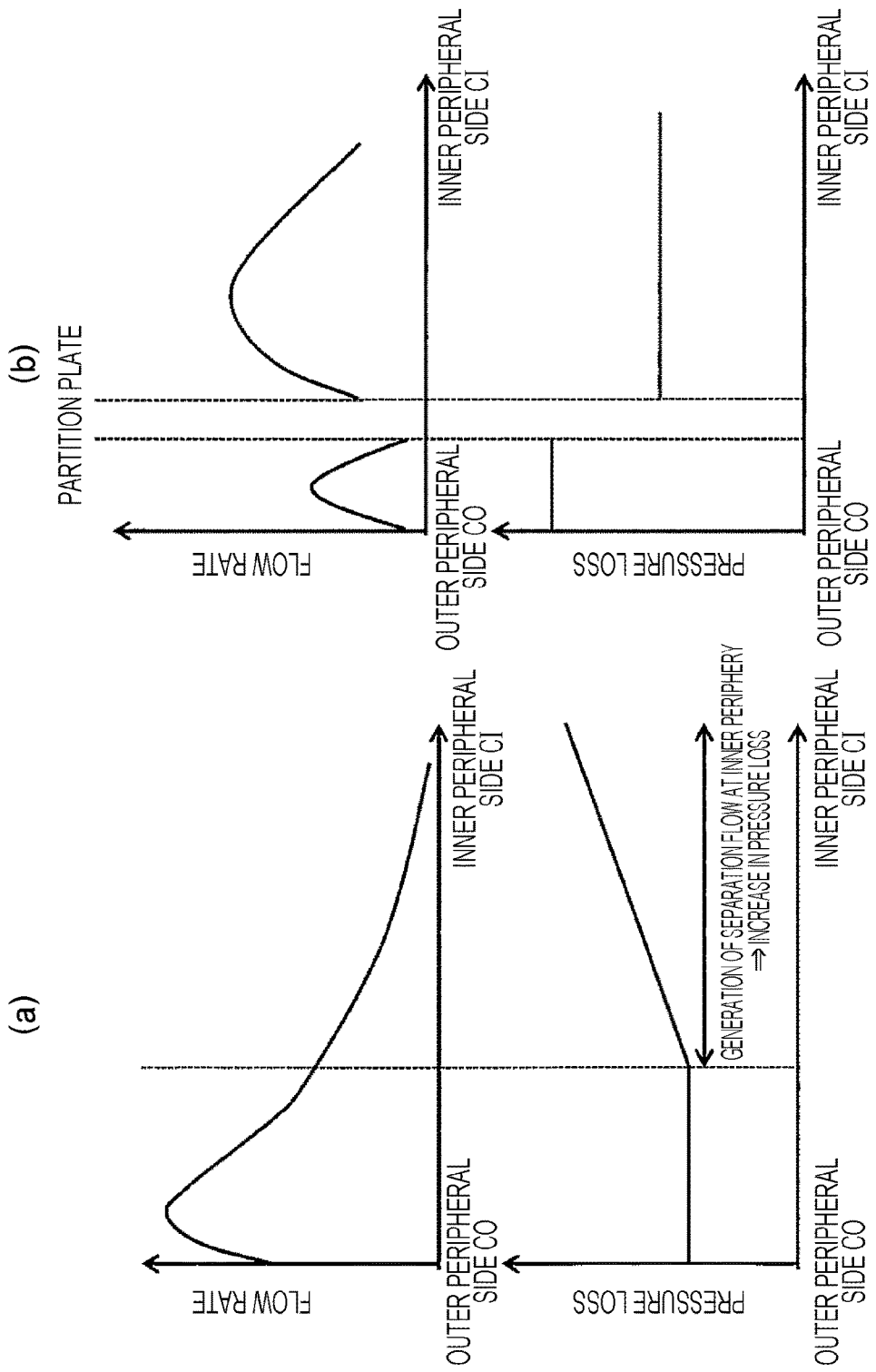
FIG. 13(a) is a diagram illustrating a relation between pressure loss and a flow rate distribution inside a curved passage of a sub-passage of a thermal flowmeter of the related art and FIG. 13(b) is a diagram illustrating a relation between pressure loss and a flow rate distribution inside a curved passage of the sub-passage of the thermal flowmeter illustrated in FIG. 11.

FIG. 11 is a main enlarged view of a sub-passage according to a second embodiment corresponding to a main enlarged view of the sub-passage illustrated in FIG. 3B. FIG. 12 is a cross-sectional view taken along a line C-C of FIG. 11, FIG. 13(a) is a diagram illustrating a relation between pressure loss and a flow rate distribution inside a curved passage of a sub-passage of a thermal flowmeter of the related art, and FIG. 13(b) is a diagram illustrating a relation between pressure loss and a flow rate distribution inside the bend passage of the sub-passage of the thermal flowmeter illustrated in FIG. 11. Additionally, FIG. 13(a) is a diagram similar to that of FIG. 5(a) and is provided for the comparison with FIG. 13(b).

The thermal flowmeter according to the second embodiment is different from that of the first embodiment as below. In the first embodiment, the resistance portion 50 is provided at the outer peripheral wall face 42 of the curved passage 32a, but in the second embodiment, the resistance portion 50 is provided inside the curved passage 32a.

Specifically, as illustrated in FIGS. 11 and 12, a partition wall (a partition plate) 60 which defines the curved passage 32a and serves as the resistance portion 50 is formed at the inner peripheral passage 32c through which the measurement object gas IA flows to the inner peripheral side CI of the curved passage 32a and the outer peripheral passage 32d through which the measurement object gas IA flows to the outer peripheral side CO of the curved passage 32a.

The partition wall 60 corresponds to a "resistance portion" of the invention. The partition wall 60 is formed along the flow direction of the measurement object gas IA of the curved passage 32a and is formed near the outer peripheral wall face 42 of the curved passage 32a. The upstream end 60a of the partition wall 60 is formed near the flow measurement element 602 in relation to the sub-intake opening 34 and the downstream end 60b of the partition wall 50 is formed to the upstream outer peripheral wall face 42 of the flow measurement element 602 forming the penetration hole 382.

Here, as described in the first embodiment, the sub-intake opening 34 is an intake opening which takes the measurement object gas IA flowing in the discharge passage (the first passage) 31 into the curved passage 32a of the sub-passage 330 and the discharge passage 31 is a passage which is formed to the discharge opening 355 discharging a part of the taken measurement object gas IA from the main intake opening 350 taking the measurement object gas IA flowing in the main passage 124.

In the embodiment, the partition wall 60 is formed at the housing 302, but if the curved passage 32a can be divided into the inner peripheral passage 32c and the outer peripheral passage 32d, the partition wall 60 may be formed at the rear cover 304. Further, the partition wall 60 may be formed by a part of the housing 302 and the rear cover 304.

Since such a partition wall 60 is provided, the measurement object gas IA which flows into the curved passage 32a separately flows into the inner peripheral passage 32c and the outer peripheral passage 32d at a halfway position. Since the partition wall 60 is formed near the outer peripheral wall face 42 of the curved passage 32a and the flow passage length of the outer peripheral passage 32d is longer than the flow passage length of the inner peripheral passage 32c, the measurement object gas IA hardly flows in the outer peripheral passage 32d compared to the inner peripheral passage 32c. That is, since the partition wall 60 is provided, a resistance is applied to the flow of the measurement object gas IA flowing at the outer peripheral side CO. Accordingly, as illustrated in FIG. 13(b), it is possible to increase the pressure loss of the measurement object gas IA which flows at the outer peripheral side CO of the curved passage 32a. Accordingly, since a separation flow (a separation vortex) of the measurement object gas IA generated in the vicinity of the inner peripheral wall face 43 is reduced, it is possible to suppress the flow of the measurement object gas IA flowing in the curved passage 32a from being biased to the outer peripheral side CO as illustrated in FIG. 13(a).

Particularly, since the upstream end 60a of the partition wall 60 is formed near the flow measurement element 602 in relation to the sub-intake opening 340, the measurement object gas IA is not divided by the partition wall 60 in the sub-intake opening 340. Accordingly, regarding the measurement object gas IA taken from the sub-intake opening 340, the pressure loss of the measurement object gas IA flowing at the outer peripheral side CO of the curved passage 32a increases. Thus, it is possible to further reduce a separation flow (a separation vortex) of the measurement object gas IA generated in the vicinity of the inner peripheral wall face 43.

While the embodiments of the invention have been described, the invention is not limited to the aforementioned embodiments and various modifications in design can be made without departing from the spirit of the invention of claims. For example, the aforementioned embodiments have been described in detail in order to easily describe the invention and all configurations are not essentially necessary in the invention. Further, a part of the configuration of a certain embodiment can be replaced by the configurations of the other embodiments and the configuration of the other embodiment can be added to the configuration of a certain embodiment. Furthermore, a part of the configurations of the embodiments can be added, deleted, and replaced.

For example, in the first and second embodiments, the first passage (the discharge passage) is provided as a part of the sub-passage, but if the above-described effect can be anticipated, the sub-passage may include only the second passage which is the flow amount measurement passage.

In the first and second embodiments, the resistance portion is provided at the curved passage which is the sensor upstream passage, but the same configuration may be provided at the sensor downstream passage in consideration of a reverse flow generated during a pulsation. Further, the curved passage which is the sensor upstream passage of the first embodiment may be further provided with the partition wall illustrated in the second embodiment.

REFERENCE SIGNS LIST 30 thermal flowmeter
31 first passage (discharge passage)
31A upstream passage
32 second passage
32a sensor upstream passage (curved passage)
32b sensor downstream passage
32c inner peripheral passage
32d outer peripheral passage
34 sub-intake opening
50 resistance portion
52a, 52b inclined face
52a', 52b' inclined face
52c bottom face
42 outer peripheral wall face
43 inner peripheral wall face 55 groove portion
55a bottom portion of groove portion
58 gap
60 partition wall
124 main passage
302 housing
303 front cover
304 rear cover
330 sub-passage
350 main intake opening
355 discharge opening
437 measurement front face (heat transmission face)
602 flow measurement element
CI inner peripheral side
CO outer peripheral side
IA measurement object gas
F virtual plane

The invention claimed is:

1. A thermal flowmeter for measuring a flow of a measurement object gas flowing in a main passage, the thermal flowmeter comprising:
a sub-passage taking a part of the measurement object gas flowing in the main passage;
a flow measurement element that measures a flow amount of the measurement object gas flowing in the sub-passage;
a curved passage that is formed in the sub-passage which is bent toward the flow measurement element so that the measurement object gas taken from the main passage flows to the flow measurement element; and
a resistance portion that causes a pressure loss of the measurement object gas flowing at an outer peripheral side of the curved passage becomes higher than that of an inner peripheral side of the curved passage, wherein the resistance portion includes:
a pair of opposite inclined faces formed on an outer peripheral wall face of the outer peripheral side of the curved passage along a flow direction of the measurement object gas, wherein each of the pair of inclined faces are inclined with respect to a virtual plane following a measurement front face of the flow measurement element to form a concave surface on the outer peripheral wall face, and
a gap between the pair of opposite inclined faces located at an intersection of the intersection of the opposite inclined faces.

2. The thermal flowmeter according to claim 1, wherein the pair of opposite inclined faces is formed so that a bottom portion of a groove portion formed by the pair of opposite inclined faces or a vicinity thereof is located on the virtual plane.

3. The thermal flowmeter according to claim 2, wherein the pair of opposite inclined faces is inclined so that the virtual plane is interposed therebetween.

4. The thermal flowmeter according to claim 1, wherein the gap is formed in a same direction as an extension direction of the virtual plane.

5. The thermal flowmeter according to claim 1, wherein the resistance portion is a partition wall which is formed near the outer peripheral wall face of the curved passage so that the curved passage is divided into an inner peripheral passage through the measurement object gas flows at the inner peripheral side of the curved passage and an outer peripheral passage through which the measurement object gas flows at the outer peripheral side of the curved passage.

6. The thermal flowmeter according to claim 5, wherein the sub-passage includes a discharge passage which is formed from a main intake opening, taking the measurement object gas flowing in the main passage, to a discharge opening discharging a part of the measurement object gas,
wherein the curved passage is a passage which is formed from a sub-intake opening, taking the measurement object gas flowing in the discharge passage, toward the flow measurement element, and
wherein an upstream end of the partition wall is formed near the flow measurement element in relation to the sub-intake opening.

7. The thermal flowmeter according to claim 1, further comprising:
a housing that contains the sub-passage;
wherein the gap extends through a front cover and a rear cover of the housing.

* * * * *